United States Patent [19]

Kisor

[11] Patent Number: 6,098,091
[45] Date of Patent: *Aug. 1, 2000

[54] METHOD AND SYSTEM INCLUDING A CENTRAL COMPUTER THAT ASSIGNS TASKS TO IDLE WORKSTATIONS USING AVAILABILITY SCHEDULES AND COMPUTATIONAL CAPABILITIES

[75] Inventor: Greg Kisor, Beaverton, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/777,024

[22] Filed: Dec. 30, 1996

[51] Int. Cl.[7] .............................. G06F 15/16; G06F 9/00
[52] U.S. Cl. ......................... 709/202; 709/102; 709/100
[58] Field of Search ..................... 395/200.54, 200.32, 395/674; 709/202, 224, 104, 100, 102, 103

[56] References Cited

U.S. PATENT DOCUMENTS

| | | | |
|---|---|---|---|
| 4,827,508 | 5/1989 | Shear | 380/4 |
| 4,969,092 | 11/1990 | Shorter | 709/102 |
| 5,025,369 | 6/1991 | Schwartz | 709/102 |
| 5,109,512 | 4/1992 | Bahr et al. | 395/673 |
| 5,136,708 | 8/1992 | Lapourte et al. | 709/103 |
| 5,341,477 | 8/1994 | Pitkin et al. | 395/200.33 |
| 5,410,651 | 4/1995 | Sekizawa et al. | 395/200.54 |
| 5,522,070 | 5/1996 | Sumimoto | 395/674 |
| 5,568,375 | 10/1996 | Rausch | 364/131 |
| 5,710,884 | 1/1998 | Dedrick | 395/200.47 |
| 5,758,077 | 5/1998 | Danahy et al. | 395/200.31 |
| 5,758,345 | 5/1998 | Wang | 707/100 |
| 5,774,668 | 6/1998 | Choquier et al. | 395/200.53 |
| 5,815,665 | 9/1998 | Teper et al. | 395/200.59 |
| 5,881,284 | 3/1999 | Kubo | 709/100 |
| 5,964,832 | 10/1999 | Kisor | 709/202 |

OTHER PUBLICATIONS

Lizkow, M., et al., "Condor—A Hunter of Idle Workstations," Proc. of the 8th Int'l. Conf. On Distributed Computing Systems, IEEE, pp. 104–111, Jun. 1998.

Theimer, M., et al., "Finding Idle Machines in a Workstation–Based Distributed System," IEEE Trans. on Software Engineering, vol. 15, No. 11 pp. 1444–1458., Nov. 1989.

(List continued on next page.)

*Primary Examiner*—Zarni Maung
*Assistant Examiner*—Andrew Caldwell
*Attorney, Agent, or Firm*—Blakely, Sokoloff, Taylor & Zafman LLP

[57] ABSTRACT

A method and system for assigning tasks to peer-to-peer computers connected via a wide area network. The system includes a central computer and one or more remote computers. The central computer and the remote computers operate in one of a pluralility of relationships, including a subscriber relationship and a contractor relationship. In the subscriber relationship, the central computer determines whether a remote computer still subscribes to an Internet Service Provider (ISP) and bills the remote computer accordingly. In the contractor relationship, the central computer polls each remote computer to inquire about the available times when the remote computer is idle and the computational capabilities of the remote computer. The central computer then executes an assignment or scheduling program to assign tasks to idle remote computers for processing. After the idle remote computers finish processing the assigned tasks, the central computer credits a payment to the remote computer. In one embodiment, the remote computer disconnects from the network while processing the assigned task and periodically reconnects to transmit status reports to the central computer.

27 Claims, 6 Drawing Sheets

OTHER PUBLICATIONS

Clark, H., et al., "DAWGS—A Distributed Computer Server Utilizing Idle Workstations," Proc. of the 5th Distributed Memory Computing Conf., IEEE, pp. 732–741, 1990.

Blumofe, R, et al., "Scheduling Large–Scale Parallel Computations on Networks of Workstations," Proc. of the 3rd IEEE Int'l. Symp. on High Performance Distributed Computing, pp. 96–105, Aug. 1994.

Celenk, M., et al., "Parallel Task Execution in LANs and Performance Analysis," Proc. of the 1995 IEEE 14th Annual Int'l. Phoenix Conf. on Computers and Communications, pp. 423–429, Mar. 1995.

Kremien, O., "Buying and Selling Computational Power Over the Network," Proc. of the 4th Int'l. Conf. on Computer Communications and Networks, IEEE, pp. 616–619, Sep. 1995.

Chen, C., et al., "The DBC: Processing Scientific Data Over the Internet," Proc. of the 16th Int'l. Conf. on Distributed Computing Systems, pp. 673–679, May 1996.

Shiuan, J. et al., "Client–Server Based Ray–Tracer Using ASTRA: an Asynchronous RPC Mechanism," Computer Communications, vol. 19, No. 5, 445–455, May 1996.

Tandiary, F., et al., "Batrun: Utilizing Idle Workstations for Large–Scale Computing," IEEE Parallel & Distributed Technology: Systems and Applications, vol. 4, No. 2, pp. 41–48, Aug. 1996.

Morris, J., et al., "Fault Tolerant Networks of Workstations," Proc. of the 3rd Int'l. Conf. on High Performance Computing, IEEE, pp. 271–276, Dec. 1996.

Waldspurger, C., et al., "Spawn: A Distributed Computational Economy," IEEE Trans. on Software Engineering, vol. 18, No. 2, pp. 103–117, Feb. 1992.

Derfler, F., et al., "How Networks Work," Ziff–Davis Press, pp. 141–163, 1996.-

METHOD AND SYSTEM INCLUDING A CENTRAL COMPUTER THAT ASSIGNS TASKS TO IDLE WORKSTATIONS USING AVAILABILITY SCHEDULES AND COMPUTATIONAL CAPABILITIES

BACKGROUND OF THE INVENTION

1. Field of the Invention

The present invention relates generally to a management system for managing a distributed system of Internet computers connected via the Internet or similar Wide Area Network. More particularly, the present invention relates to apportioning tasks among personal computers connected via wide area networks. The invention is particularly relevant to assigning tasks to personal computers at the time of day in which the personal computers would otherwise be idle.

2. Description of the Related Art

In recent years, wide area networks ("WAN") have become an important part of the day to day lives of many computer owners. Every day millions of users connect to the most well known WAN, the Internet. Nearly every personal computer ("PC") user having a modem and a telephone line can access the Internet for little cost through commercial companies that provide a gateway to the Internet. Personal computers operate in a subscriber relationship with a central computer provided by the company providing the gateway to the Internet wherein the personal computer receives data and computing services from the central computer in exchange for paying a charge. Internet services include E-Mail, database access, and news groups. The Internet also acts as a service medium for many companies trying to market products.

Many of the personal computers which are connected to WANs are high powered personal computers which may contain microprocessors, such as the Intel Pentium® or PentiumPro™ microprocessor. These personal computers may also include RAM memory, a display unit, long-term storage such as a hard disk drive, and other proprietary processors such as video graphic cards and math co-processors. These independent, stand-alone computers are idle for a significant portion of the day. For example, a personal computer owned at home may be idle or even off while the owner is away at work. The computer may also be idle at night while the owner is asleep. Personal computers at the office may only be utilized from 9 A.M. in the morning till 5 P.M. in the evening. At any particular time, peak usage in one part of the world can be offset by low usage in a different part of the world. For example, periods of high computer usage in New York City may be night time in Tokyo when idle personal computers are readily available. It would be advantageous to find a way of utilizing this wasted computer resource.

As WANs, such as the Internet, become more popular, the demand on the computational power of the computers which provide WAN services keeps increasing. Computers, including servers, must perform many tasks including the providing and generating of WEB pages, compressing Moving Pictures Expert Group ("MPEG") and Joint Photographic Expert Group ("JPEG") images, and serving up WEB pages. These tasks and the exploding number of users place increasing demands on the computers at WAN service providers and Internet WEB sites. Service providers, such as American On-Line™ ("AOL") and Compuserve increasingly must buy more powerful computers to service the additional members and the new content that is constantly being updated. These service providers could save on computer costs if some of the computational requirements of their system could be serviced by personal computers owned by private individuals and other independent entities who subscribe to the Internet provider services.

Any system which attempts to use PCs coupled to the Internet service providers ("ISP") to satisfy computational requirements must be dynamic and easily modifiable. Each computer connecting to the ISP may be independently owned and individual owners may frequently change their personal computer system characteristics. Furthermore, subscribers with PCs are frequently being added to the ISP network, while other owners are dropping the ISP service. AOL, for example, has a "churn" rate of thousands of computers adding and dropping the service every year.

Thus, there exists a need for a dynamic, accommodating system capable of assigning tasks required by Internet Service Provider to personal computers and coordinating transmission and completion of those tasks.

SUMMARY OF THE INVENTION

The present invention is a method and apparatus for WAN computing including a central computer which coordinates tasks performed by a plurality of independent remote computers. The central computer polls the remote computers as to time of day the remote computers will be available and computational capabilities of the remote computers. The central computer then matches tasks to be completed with remote computers based on the results of the polling and transmits the task to the assigned remote computers at the appropriate time.

BRIEF DESCRIPTION OF THE DRAWINGS

The advantages of the present invention will become more readily apparent to those ordinarily skilled in the art after reviewing the following detailed description and accompanying drawings, wherein.

DETAILED DESCRIPTION OF THE INVENTION

The present invention relates to a method and apparatus for distributing tasks from a central computer to remote computers over a wide area network. In the following description, some terminology is used to discuss the network. A wide area network ("WAN") is a data network which is not restricted in terms of distance. Typical distances can be larger than 100 kilometers. A local area network ("LAN") are data networks which are restricted in distance, typically distances between computers in a LAN are less than 500 meters. Typical LAN networks include Ethernet and Token Ring Networks.

Typically, a WAN is a collection of packet switching networks that are physically interconnected by protocol gateways. These networks use protocols that allow them to function as a large, composite network. The Internet is a WAN connecting thousands of disparate networks and industry, education, government, and research. The Internet network uses transmission control protocol/Internet protocol ("TCP/IP") as a standard for transmitting information. TCP/IP is a set of communication protocols that support peer-to-peer connectivity functions for WANs. The Internet protocol works in an Internet layer delivering Internet protocol packets to the proper destinations. The Internet layer permits hosts to inject data packets into any network and have them travel independently to their intended destination (potentially on a different network). The packets may arrive in a different order than they were sent, in which case a higher level system must rearrange the data packets in the proper delivery order.

Figure 1:
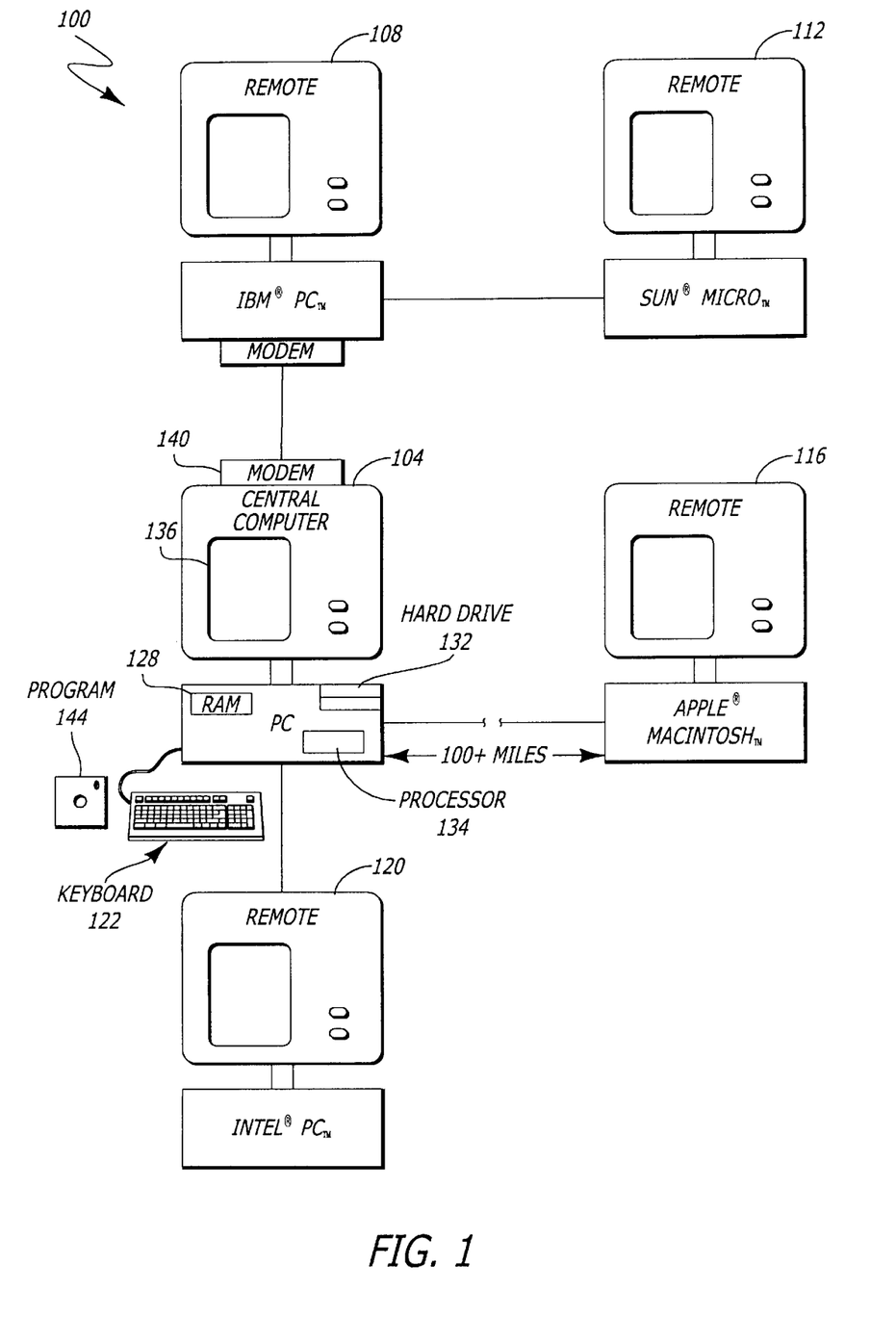
FIG. 1 is an illustrative block diagram of one embodiment of a distributed system including a central computer and remote computers.

FIG. 1 is an illustration of the computer network 100. The computer network 100 includes a central computer 104 and a plurality of remote computers 108, 112, 116 and 120. Each computer including both, the central computer and the remote computer may be a variety of different types of computers from different computer vendors e.g. a IBM® computer 108, an Apple® computer 116, and a Sun® workstation 112. However, in one embodiment as pictured, each computer is a personal computer ("PC") with independent computer components including a single microprocessor. The independent computer components include a keyboard 122, a processor 134, a random access memory 128, a long term storage device 132 and a display device 136. Each computer may be coupled to other computers in the Internet network via a variety of communication techniques, including ISDN lines, typical telephone lines, cable modems, satellite transmission, or other emerging as well as established communication techniques. If standard analog telephone lines are used, a modem device 140 is used to convert the digital information into analog information for transmission along standard twisted pair telephone line. Typically, the computers are part of a WAN and may be separated by hundreds or even thousands of miles. Thus, it is also envisioned that the central computer may communicate with remote computers using radio signals or other communication technologies.

The central computer 104 executes a management program 144 to coordinate operation of the network. The central computer preferably is a high performance PC. The central computer and the remote computers operate in a peer-to-peer relationship, such that each computer requests time, and no computer exercises control over another computer. The peer-to-peer relationship allows the duties of the central computer 104 to be easily transferred to a remote computer. Thus, in a preferred embodiment, the assignments handled by the central computer may be passed from the central computer 104 to a remote computer such that former remote computer 112 acts as the central computer. In order to pass off the tasks of the central computer, the former central computer must transfer the scheduler including the tasks to be completed and the resources available to the remote computer 112.

Management program 144 contains instructions executed by the central computer which polls the remote computers 108, 112, 116 and 120 as to times of day when the remote computers are available to provide computing services to the central computer in a contractor relationship. The management program also determines remote computer system capabilities. The remote computer responses are processed and tasks assigned to remote computers to be completed at times in which the remote computers agrees to be available to operate in a contractor relationship.

Figure 2:
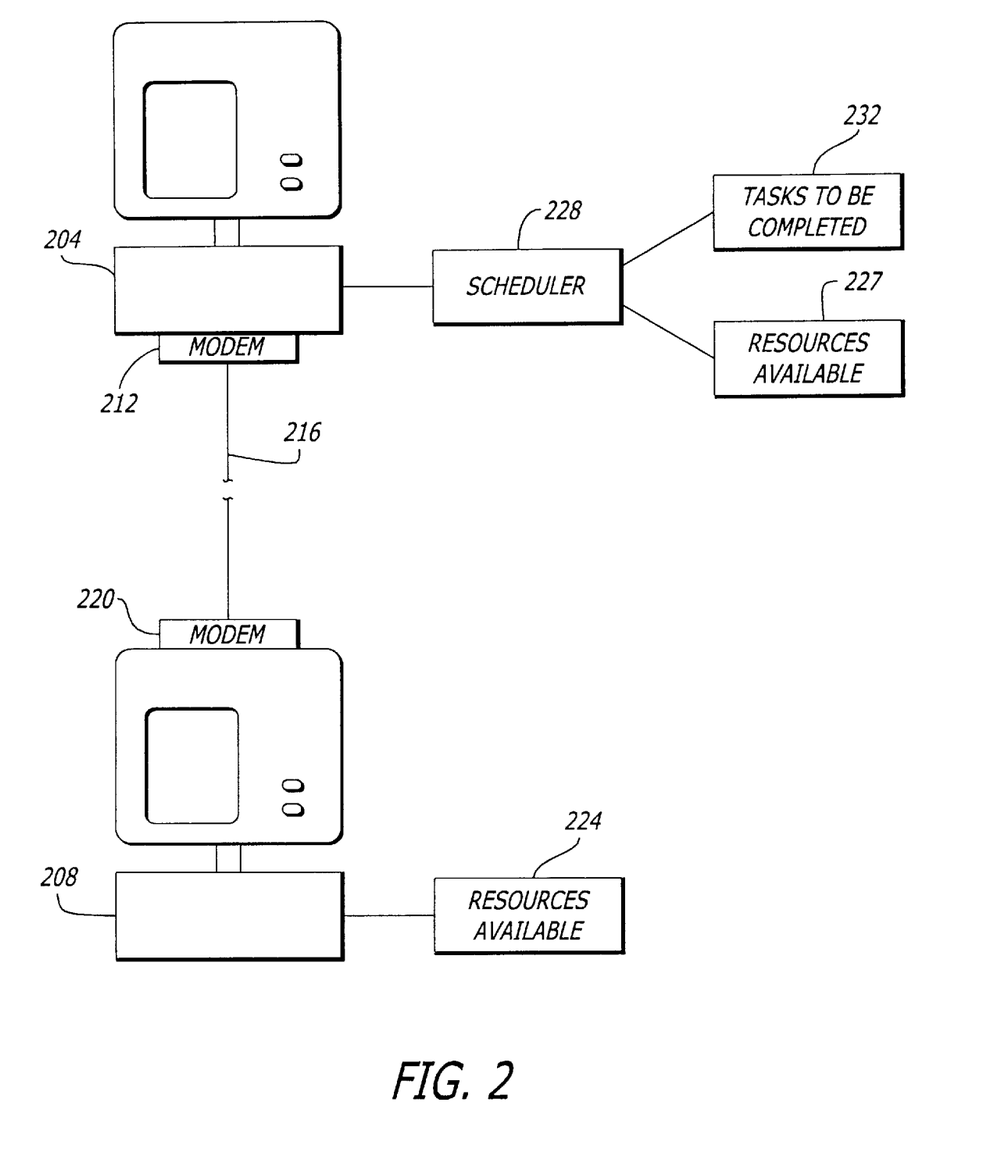
FIG. 2 is an illustrative block diagram of the central computer and the information coordinated by the central computer coupled with a remote computer and the information available on the remote computer.

FIG. 2 is an illustrative block diagram of the central computer 204 and the information coordinated by the central computer coupled with a remote computer 208 and the information available to the remote computer. In one embodiment, the central computer 204 is coupled to a modem 212 which converts information into a form appropriate for a telephone line 216. A second modem 220 coupled to the remote computer converts the telephone signal back into a form appropriate for processing by the remote computer. The telephone line 216 may include routing routers and forwarding networks between central computer 204 and remote computer 208.

Many protocols are available for connecting the central computer to the remote computer. In particular, packet based protocols are preferred. Such packet-based protocols include APPLETALK™ from Apple Computer, Inc. of Cupertino, Calif., ITUTX25 (from International Telecommunications Union Standard) or Frame Relay, and SPX/IPX from Novell of San Jose, Calif. In one embodiment, Integrated Services Digital Network ("ISDN") lines may be used to connect the central computer 204 with the remote computer 208. ISDN is a digital end-to-end telecommunication network that supports multiple services including, but not limited to voice and data. In a preferred embodiment of the invention, an Always On/Dynamic ISDN (AO/DI) is used. AO/DI is a networking service that provides an always-available connection to packet-based data services through the WAN.

Although the prior paragraph describes one method of implementing a connect-disconnect routine for connecting Internet coupled computers, other methods are also available. For example, satellite and cable modem hook-ups may be implemented.

The central computer 204 runs management program 144 which periodically polls remote systems 208 regarding the time of day when the remote system will be available to operate in a contractor relationship and the resources available 224 on the remote system 208. This information is transmitted back by the remote system 208 along the line 216 to the central computer 204.

The central system 204 executes a management program 144 which includes a scheduler 228. The scheduler 228 organizes tasks 232 that need to be completed with the resources available information 224 transmitted by the remote computer 208. The central computer then generates a schedule of tasks to be completed by the remote computers.

Figure 3A:
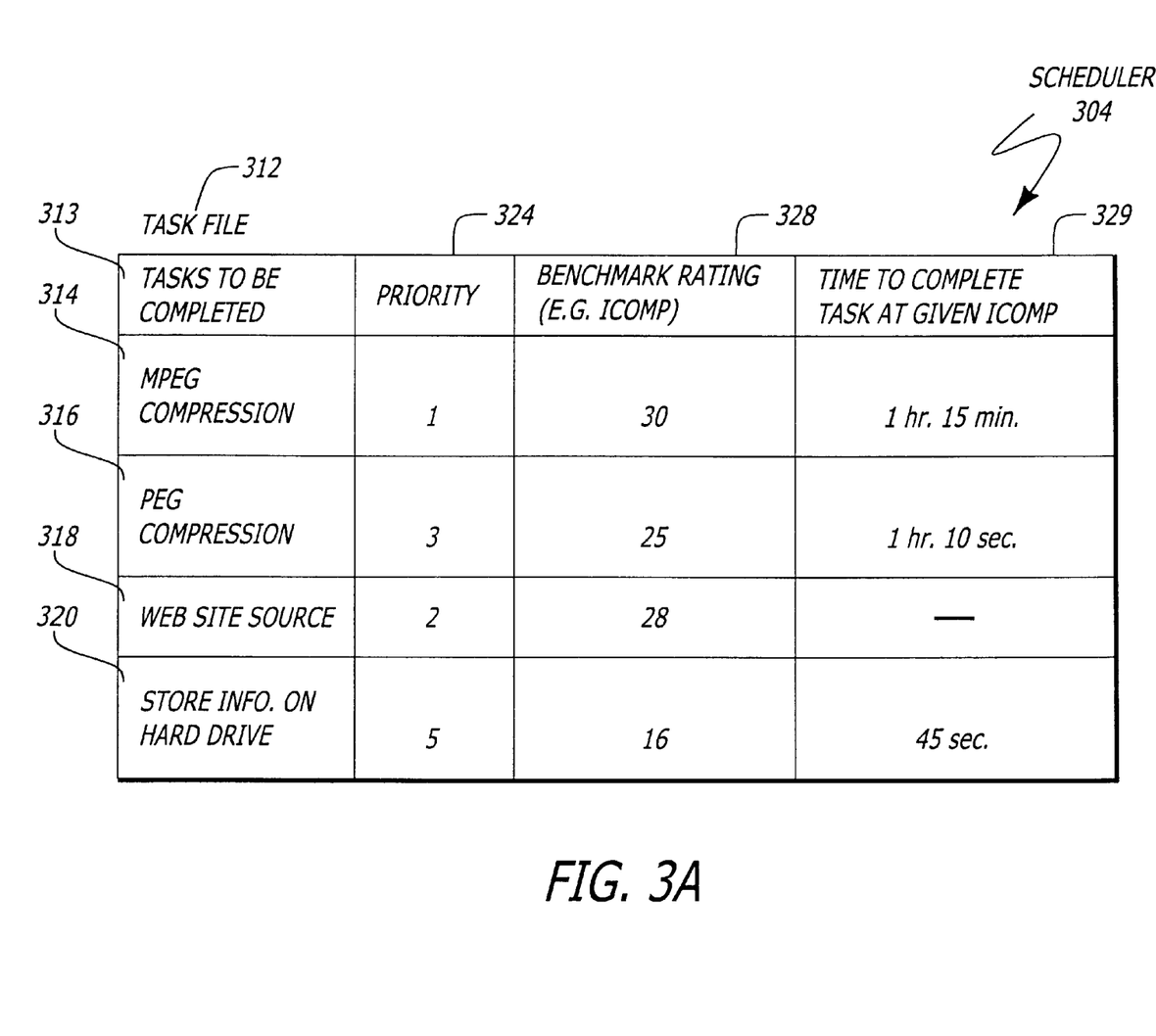
FIGS. 3A and 3B are illustrative block diagrams showing one example of a resources available information table and a tasks to be completed information table; and, FIG. 4 is an flow chart showing the steps taken by the central computer in managing the distribution of tasks to the remote computer.
Figure 3B:
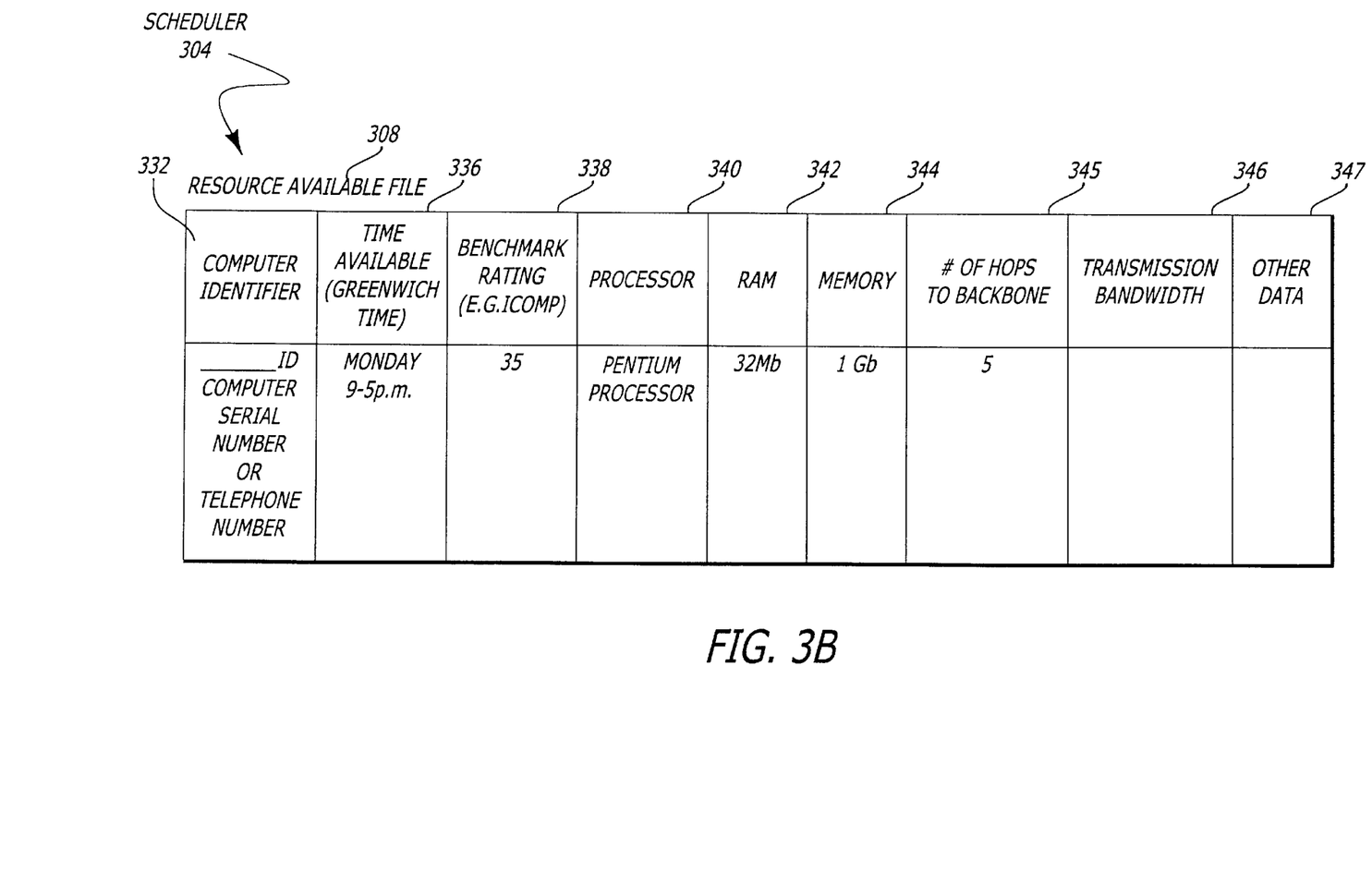

FIGS. 3A and 3B are block diagrams illustrating one example of how the resources available file 224 and the tasks file 232 might be organized. Specifically FIGS. 3A and 3B illustrate one embodiment of data fields used by the scheduler 304 to handle data from the resources available 308 and the tasks file 312. More specifically, FIG. 3A illustrates the tasks file 312 including a tasks to be completed field 313. Typical examples of tasks to be completed 312 include MPEG compression 314, JPEG compression 316, acting as a HyperText transfer protocol ("HTTP") server 318 serving Internet Web pages, and storing information on hard drives 320. Each task to be completed field 313 has a corresponding priority field 324 which indicates the importance of the tasks completion to the overall system. In order to support the concept of priority, two or more levels of importance must be specified. High priority tasks may be duplicated and sent to multiple remote computers to ensure robustness and prevent system failure if a particular remote computer fails to complete its task. Each task to be complete field 313 may also be associated with a benchmark rating field 328 including a measure of computational requirements in a standard unit such as an ICOMP rating 328 (Intel computational rating) and an amount of time field 329 indicating the amount of time needed to complete the task at the given benchmark rating. Other examples of benchmark ratings that may be used include a millions of instructions per second ("MIPS") rating or a benchmark tailored for the specific task such as JPEG pixels per second. This information can be used to more appropriately assign assignment tasks to be completed to the appropriate remote computers using the resources available table 308. Tasks to be completed fields 313 may also be associated with other computational needs such as memory requirements and co-processor requirements. Such data may be contained in additional data fields in the tasks file 312.

Referring now to FIG. 3B, scheduler 304 coordinates the tasks file 312 with the resource available file 308. The information in resource available file 308 of FIG. 3B was transmitted by the remote computers to the central computer. Each remote computer may be associated with a machine identification (e.g. Internet address), a computer serial number or a phone number at which the remote computer can be reached. This information is indexed in a computer identifier field 332. Corresponding with the computer identifier field 332 may be other data fields such as a time available field 336 indicating when the remote computer is available. The time when the remote computer is available should be given in a worldwide standardized time frame, such as the time of day in Greenwich mean time. Other possible corresponding data fields include the benchmark rating field 338 indicating hardware capabilities available at the remote computer, the processor field 340 indicating the type of processor used by the remote computer, the RAM field 342 indicating RAM available on the remote computer, the memory field 344 including memory available for long term storage 344, the number of hops to an Internet backbone field 345 (indicating the number of hops which is the number of routers or switches between the backbone and the remote computer), the transmission bandwidth field 346 indicating the transmission bandwidth of communications with the remote computer and other data fields 347 which may indicate other hardware such as processing cards that may be available. All of this information may be coded so that the central computer can appropriately assign a task to be completed to remote computers most efficiently able to complete the task. At the times when the remote computer has agreed to operate in a contractor relationship, the central computer using the management program will follow scheduler instructions and will send the assigned task to the remote computer.

Figure 4:
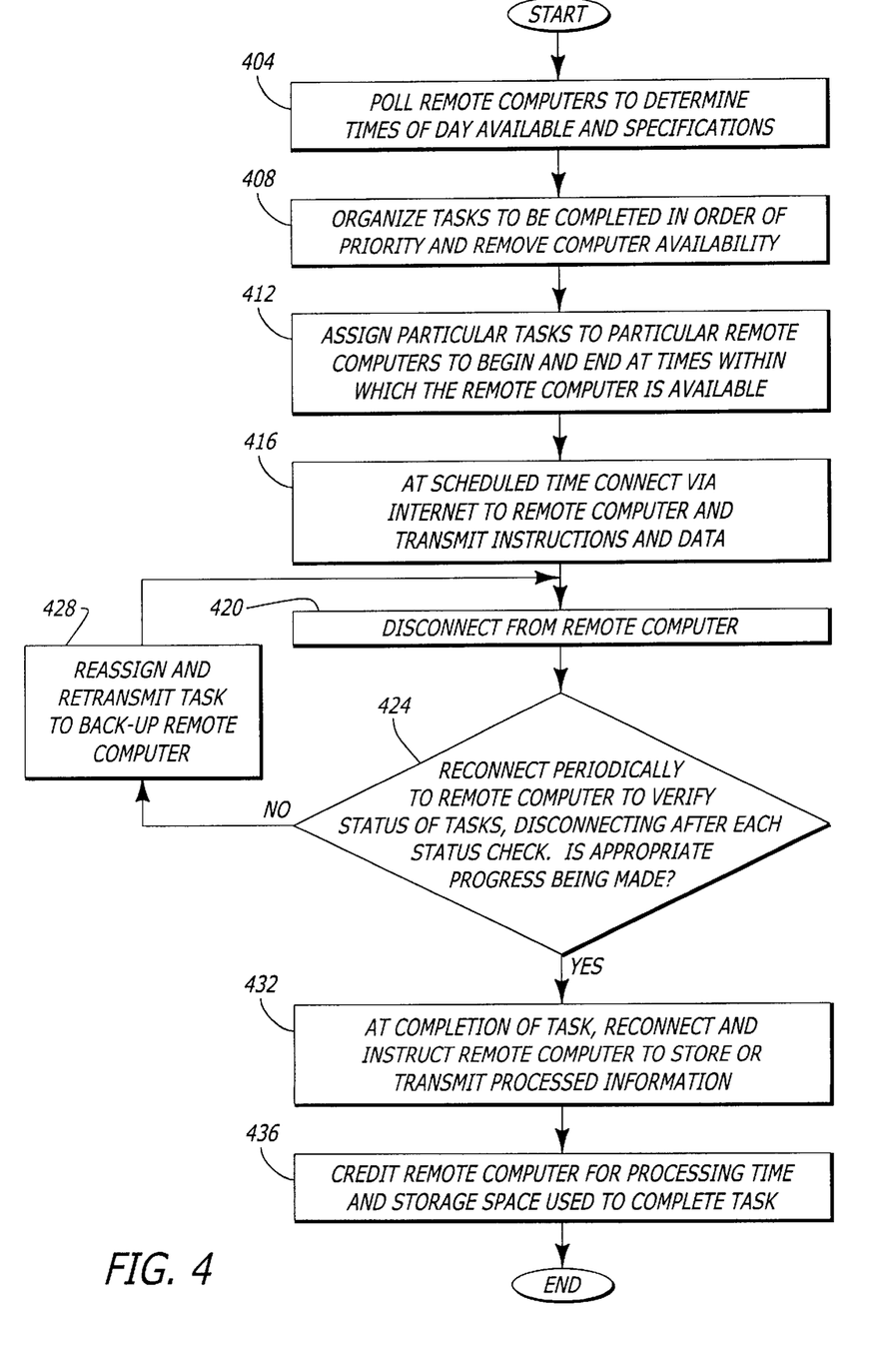

FIG. 4 is a flow diagram of the processes executed by the central computer 104. In step 404, the central computer polls the remote computer to determine whether the remote computer still subscribes to the ISP Service, the time of day the remote will be available to operate in a contractor relationship and the hardware specifications of the remote computer. The polling should occur on a periodic basis to account for consumers dropping and adding the ISP service. Preferably, the polling occurs on a daily basis to coincide with the billing and determination of who is still a member of the ISP service. The information on when the remote computer will be available to operate in a contractor relationship may have been input by the contracting PC owner or the information may be drawn from past availability patterns subject to override by the PC owner. The polling may also commit the contracting PC owner not to change the PC configuration for a 24 hour period. The specifications retrieved during polling may include a variety of data, including but not limited to long term storage memory, microprocessor, and other personal computer components. The answers to the queries may be programmed in diagnostic routines which run on the remote computer and relay the information to the central computer or the answers may be entered by the owner of the remote computer. The remote computer is designed to be completely independent of the central computer.

In Step 408, the central computer organizes the tasks to be completed in order of priority and system computational requirements taking into account remote computer availability.

In Step 412, the central computer assigns the tasks to particular remote computers. The tasks are assigned considering the resources available to the remote computer and the time of day that the remote computer is available to operate in a contractor relationship. High priority tasks may be assigned to two or more separate remote computers to improve the robustness of the system. The remote computer assignments also take into account the computational requirements of the task and assign computationally intensive tasks to computers with appropriate hardware. For example, a computationally intensive task might be assigned to a computer with a PentiumPro™ processor, while a HTTP server site task might be assigned to a computer with significant long term storage memory capabilities (e.g. a large hard disk drive).

At a scheduled time when the remote computer is available to operate in a contractor relationship, the central computer arranges to connect the remote computer to the Internet and transfers the instructions and data necessary for the remote computer to complete the task (Step 416). The connection may be achieved by a variety of means, one possible means is the AO/DI line, although other embodiments are also available. After transferring the data, the remote computer may be disconnected from the central computer (Step 420). In some embodiments, for example satellite or cable modem, the connect and disconnect steps may be unnecessary because the remote computer and the central computer are always connected. During the period in which the remote computer is completing the tasks assigned by the central computer, the connection between the remote computer and the central computer is reestablished periodically to verify the status of the tasks and confirm that the task is being completed on schedule (Step 424). If during one of the verifications sessions, the remote computer fails to respond or indicates that there is difficulty completing the assigned tasks, the central computer will reassign and retransmit the task to another back-up remote computer (Step 428). Otherwise, the remote computer will complete the task and reconnect to the central computer to inform the central computer on the completion of the task, at which time the central computer will instruct the remote computer whether to store the information for future retrieval or to transmit the processed information back to the central computer or other designated computer (Step 432).

Finally, after completion of the task, the central computer will credit a payment to an account corresponding to the remote computer for the computer time spent by the remote computer on the allotted task. A billing program may take into account the processing time used, the storage space used, and even the time of day at which the task was completed (e.g., remote computers which performed tasks during peak computing times may receive more credit than remote computers which complete the tasks late in the night). The billing program may periodically update the established client accounts.

Figure 5:
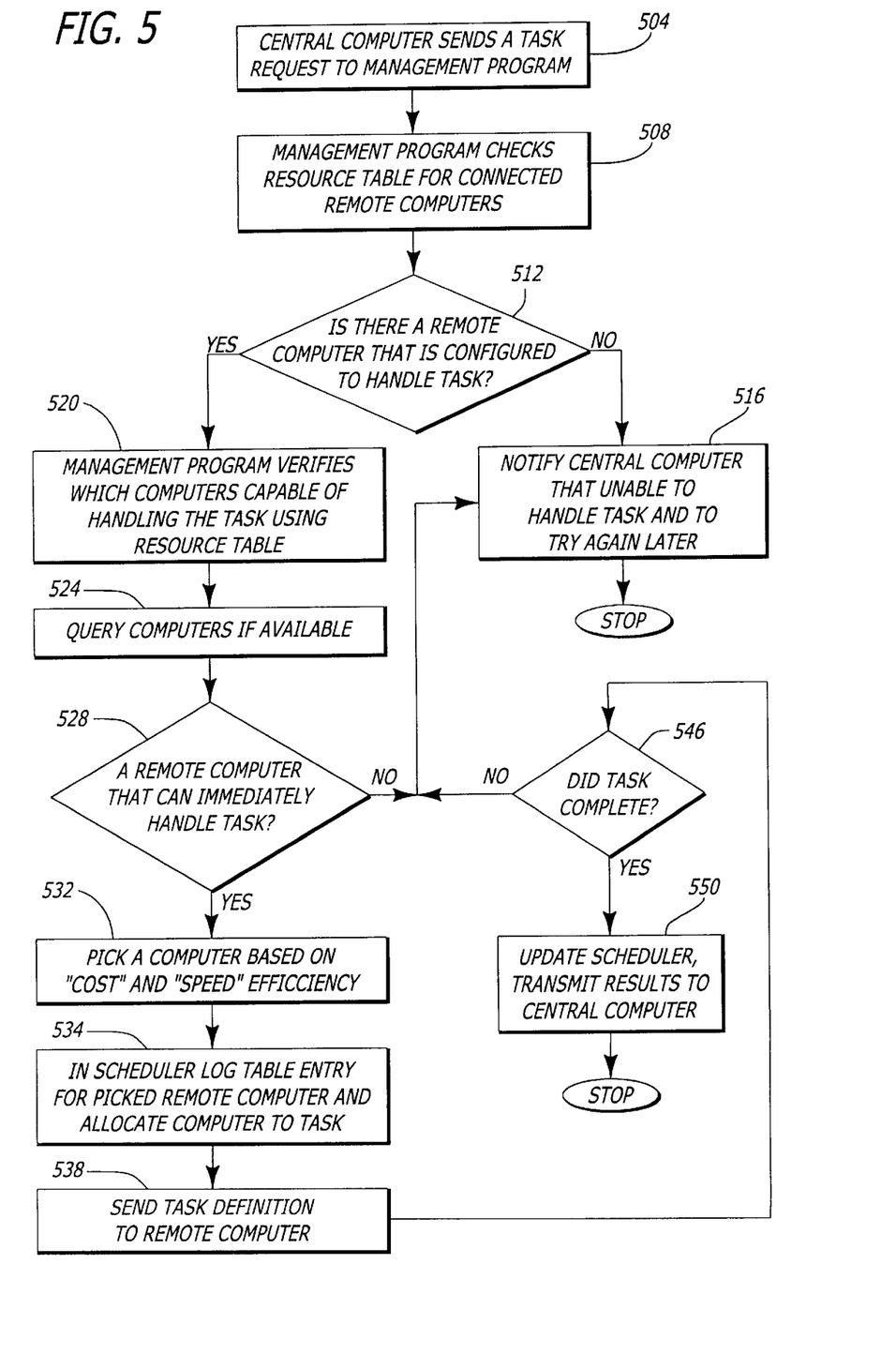
FIG. 5 is a flow chart illustrating one embodiment of the steps performed by the central computer management program.

FIG. 5 is a flow chart illustrating the processing steps executed by the central computer management program in accordance with one embodiment of the present invention. The embodiment of FIG. 5 is particularly useful in very dynamic situation where new tasks are constantly being assigned and it is more difficult to schedule ahead all tasks and match with appropriate remote computers.

In the embodiment shown in FIG. 5, the central computer sends a task request to the management program of this central computer (Step 504). The management program checks the resource table for connected or remote computers which are subscribing to the Internet service (Step 508). It then determines if there is a remote computer that is configured to handle the task (Step 512). If the task is not capable of being handled by any remote computer currently subscribing to the network, the management program notifies the central computer that it is unable to currently handle the task and to try again later (Step 516).

When there are computers subscribing to the Internet provider capable of handling the task assignment, the management program identifies which computers are capable of handling the tasks using the resource table (Step 520). The management program then queries the computers as to whether they are available (Step 524 and 528). If no computers are available, the central computer is informed of the situation (Step 516). If computers are available, one remote computer is chosen based on a variety of parameters such as ability to handle the task quickly and the cost to the Internet provider for "borrowing" the remote computer for the specified period of time (Step 532). The scheduler logs the table entry for the remote computer and allocates the computer the task (Step 534). The task definition is transmitted to the remote computer (Step 538).

If the assigned task is completed by the remote computer, notification of successful completion is transmitted back to the central computer which will update the scheduler to reflect that the remote computer is once again available (Step 546 and 550). The scheduler will also appropriately credit the billing account corresponding to the remote computer. If the task did not complete, the task will be attempted again using a different remote computer.

Using the procedures described in FIG. 5, the system can handle immediate tasks which may suddenly arise and tasks which may be uncompleted because users have removed computers from the network. Thus the system is extremely dynamic and capable of handling minute to minute changes in system configuration.

The present invention described herein may be designed in many different methods and using many different configurations. While the present invention has been described in terms of various embodiments, other embodiments may come to mind to those skilled in the art with departing from the spirit and scope of the present invention. The invention should therefore be measured in terms of the claims which follow.

What is claimed is:

1. A system for peer-to-peer wide area network computing comprising:
    a communications link;
    a plurality of computers coupled to said communications link in communication with each other, said plurality of computers including a central computer and a remote computer, where said central computer and said remote computer operate in one of a plurality of relationships comprising a subscriber relationship and a contractor relationship;
    a polling program that executes on said central computer, said polling program transmitting via said communication link a query to inquire about available times when said remote computer can operate in the contractor relationship and computational capabilities of said remote computer, said remote computer responding to said query by sending a reply to said central computer, said reply indicating said abailable times and computational capabilities of said remote computer; and
    an assignment program that executes on said central computer to assign tasks to be completed by said remote computer based on said available times and said computational capabilities of said remote computer.

2. The system of claim 1 wherein:
    said tasks are assigned task priorities indicating the importance of completion of each of said tasks to the overall system; and
    said assignment program assigns tasks to be completed by said remote computer based on said tasks priorities.

3. The system of claim 1 wherein said communications link between said central computer and said remote computer includes a telephone line connection.

4. The system of claim 1 wherein said communication link between said central computer and said remote computer includes a satellite connection.

5. The system of claim 1 wherein said communications link is an integrated services digital line, said line including an Always On/dynamic Integrated services digital line.

6. The system of claim 1 wherein said central computer communicates with said remote computers using a Transmission Control Protocol/Internet Protocol.

7. The system of claim 1 wherein said central computer communicates with said remote computer using a packet-based protocol.

8. The system of claim 1 wherein said computational capabilities of said remote computer include:
    type of processor used in said remote computer;
    benchmark rating of computing power of said remote computer;
    amount of random-access-memory (RAM) available in said remote computer;
    number of hops between an Internet backbone and said remote computer; and
    transmission bandwidth of said remote computer.

9. The system of claim 2 wherein each of said tasks further associated with a corresponding benchmark rating and a time to complete each said task using the corresponding benchmark rating.

10. The system of claim 1 wherein said remote computers and said central computer are personal computers including a microprocessor, random access memory and a display device.

11. The system of claim 10 wherein said assignment program is transferred from said central computer to said remote computer such that at a particular period in time within a period in time when said remote computer is available to operate in the contractor relationship, said remote computer handles a scheduling and task tracking routine of said central computer.

12. The system of claim 1 further comprising a billing program executed by said central computer which tracks an amount of work done by said remote computer and credits a corresponding account the payment according to work done.

13. The system of claim 1 wherein the remote computer receives data and computing services from the central computer in exchange for a charge when operating in the subscriber relationship, and the remote computer provides data and computing services to the central computer in exchange for a payment when operating in the contractor relationship.

14. A management apparatus on a central computer for performing peer-to-peer computing tasks on a wide area network, said management apparatus comprising:

a polling apparatus for querying remote computers coupled to said central computer, where said central computer and said remote computer operate in one of a plurality of relationships comprising a subscriber relationship and a contractor relationship, and generating a resource availability list including available times when said remote computers can operate in the contractor relationship and computational capabilities of said remote computers; and a scheduling apparatus for assigning each task in a plurality of tasks to a remote computer in a plurality of remote computers, said assigning of each task being based on said available times when said remote computer can operate in the contractor relationship and also on said computational capabitilies of said remote computer, said scheduling apparatus subsequently transferring each task to said remote computer via the wide area network.

15. The management apparatus of claim 14 wherein said computational capabilities of said remote computer include:

type of processor used in said remote computer;

benchmark rating of computing power of said remote computer;

amount of random-access-memory (RAM) available in said remote computer;

number of hops between an Internet backbone and said remote computer; and transmission bandwidth of said remote computer.

16. The management apparatus of claim 14 wherein said management apparatus assigns priorities to said plurality of tasks, and arranges to complete high priority tasks before low priority tasks.

17. The management apparatus of claim 14 wherein said management apparatus negotiates with said remote computer, said remote computer providing computational power in exchange for resources.

18. The management apparatus of claim 14 wherein said resource availability list records computational power using an ICOMP rating.

19. The management apparatus of claim 14 wherein said resource availability list records computational power using a task specific benchmark.

20. The management apparatus of claim 14, wherein status reports are received periodically from said remote computer to determine progress in completing the task.

21. The management apparatus of claim 14 further comprising:

an error control system to periodically monitor the remote computer to determine progress towards completion of the task; and, a bill tracking system to track and credit a payment to the remote computer for completed tasks according to work done.

22. A method of distributing tasks among a plurality of remote computers connected via a wide area network and coordinated by a central computer to operate in one of a plurality of relationships including a subscriber relationship and a contractor relationship, the method comprising:

polling a remote computer of said plurality of remote computers to obtain computational capabilities of said remote computer and available times when said remote computer can operate in the contractor relationship;

assigning tasks to said remote computer based on said computational capabilities and said available times of said remote computer;

transmitting a task to said remote computer;

disconnecting said remote computer from said central computer;

periodically reconnecting and transmitting status reports from said remote computer to said central computer; and notifying said central computer of completion of said task.

23. The method of claim 22 further comprising storing a result of said task by said remote computer.

24. The method of claim 22 wherein said central computer credits a payment to a billing account corresponding to said remote computer according to work done.

25. The method of claim 22 wherein said task performed by said remote computer is a Moving Picture Experts Group compression of an image.

26. The method of claim 22 wherein said task performed by said remote computer is acting as a hypertext transmission protocol server.

27. The method of claim 22 wherein said task performed by said remote computer is a Joint Photographic Experts Group compression.

* * * * *